United States Patent [19]

Herberholz

[11] Patent Number: 4,580,593

[45] Date of Patent: Apr. 8, 1986

[54] DISK VALVE FOR CORROSIVE FLUIDS

[76] Inventor: Günter Herberholz, Hollmann Boeschken 37, 5600 Wuppertal 2, Fed. Rep. of Germany

[21] Appl. No.: 752,589

[22] Filed: Jul. 8, 1985

[30] Foreign Application Priority Data

Jul. 6, 1984 [DE] Fed. Rep. of Germany ....... 3424924

[51] Int. Cl.$^4$ .............................................. F16L 7/00
[52] U.S. Cl. .................................... 137/375; 251/306; 251/308; 277/125
[58] Field of Search ................ 137/375; 251/305, 306, 251/307, 308; 277/124, 125

[56]  References Cited

U.S. PATENT DOCUMENTS

| 1,991,715 | 2/1935 | Wheeler | 277/124 |
| 3,438,388 | 4/1969 | Schenck, Jr. | 137/375 |
| 3,958,595 | 5/1976 | Al et al. | 137/375 |
| 4,283,062 | 8/1981 | Catanzaro et al. | 277/124 |
| 4,291,863 | 9/1981 | Gachot | 251/308 |

Primary Examiner—Martin P. Schwadron
Assistant Examiner—Sheri M. Novack
Attorney, Agent, or Firm—Antonelli, Terry & Wands

[57]  ABSTRACT

The invention relates to a disk valve for corrosive fluids comprising a tubular metal housing lined with a hard-elastic, unpadded coating and a throttle disk with a hard-sealing, unpadded covering being made up of hard synthetic resin and being of a minimum thickness of three millimeters. The throttle disk is attached to two pivot pins extending through said coating and said metal housing and the throttle disk is sealing said metal housing in a transverse plane comprising the axis of said pivot pins. The pivot pins are directly enclosed by separate, hard-elastic sealing bushes seating on the covered throttle disk and being separately adjustable. In order to provide a disk valve which can be applied for a large temperature range and which has no leakages at the sealing bushes as well, the sealing bushes are respectively pressed with wedge-shaped front ends into V-shaped annular grooves of the disk covering.

9 Claims, 7 Drawing Figures

DISK VALVE FOR CORROSIVE FLUIDS

The invention relates to a disk valve for corrosive fluids comprising a tubular metal housing lined with a hard-elastic, unpadded coating and a throttle disk with a hard-sealing, unpadded covering being made up of hard synthetic resin and being of a minimum thickness of three millimeters. The throttle disk is attached to two pivot pins extending through said coating and said metal housing and the throttle disk is sealing said metal housing in a transverse plane comprising the axis of said pivot pins. The sealing peripheral surface of said disk covering is profiled as a symmetrical spherical sector and the pivot pins are directly enclosed by separate, hard-elastic sealing bushes, the sealing bushes seating on the covered throttle disk and being separately adjustable.

By the German Pat. No. 27 58 690 a disk valve is known with a tubular metal housing lined by a hard-elastic, unpadded plastic coating and with a throttle disk provided with a hard-sealing covering of tantalum. The pivot pins of that throttle disk are enclosed by separate, hard-elastic sealing bushes directly seating with their front ends on the throttle disk. By this combination of the materials of the disk-covering and of the sealing bushes, the penetration of corrosive fluids to the pivot pins is safely prevented. But because of the different thermal extension of the plastic coating of the housing and the metal throttle disk, the known disk valve can only be applied for a quite limited temperature range.

According to the German Offenlegungsschrift No. 33 13 904, the throttle disk of a disk valve can be additionally provided with a covering of perfluoralkoxy with a minimum thickness of three millimeters so that the possible temperature range is considerably enlarged. But because of the axial pressing of the sealing bushes, a creeping of the disk covering and thus slight leakages are possible. Nevertheless, such leakages with only a minimal quantity result in the destruction of the pivot pins.

It is an object of this invention to provide a disk valve which can be applied for a large temperature range and which has no leakages at the sealing bushes as well. According to an advantageous feature of the invention, the sealing bushes are respectively pressed with wedge-shaped front ends into V-shaped annular grooves of the disk covering. Thus, the sealing effect at the front ends of the sealing bushes considerably improves and is even maintained, if the covering of the throttle disk evades a little bit by creeping.

The invention will now be described with reference to the accompanying drawings illustrating two preferred embodiments of the disk valve according to the present invention.

Figure 1:
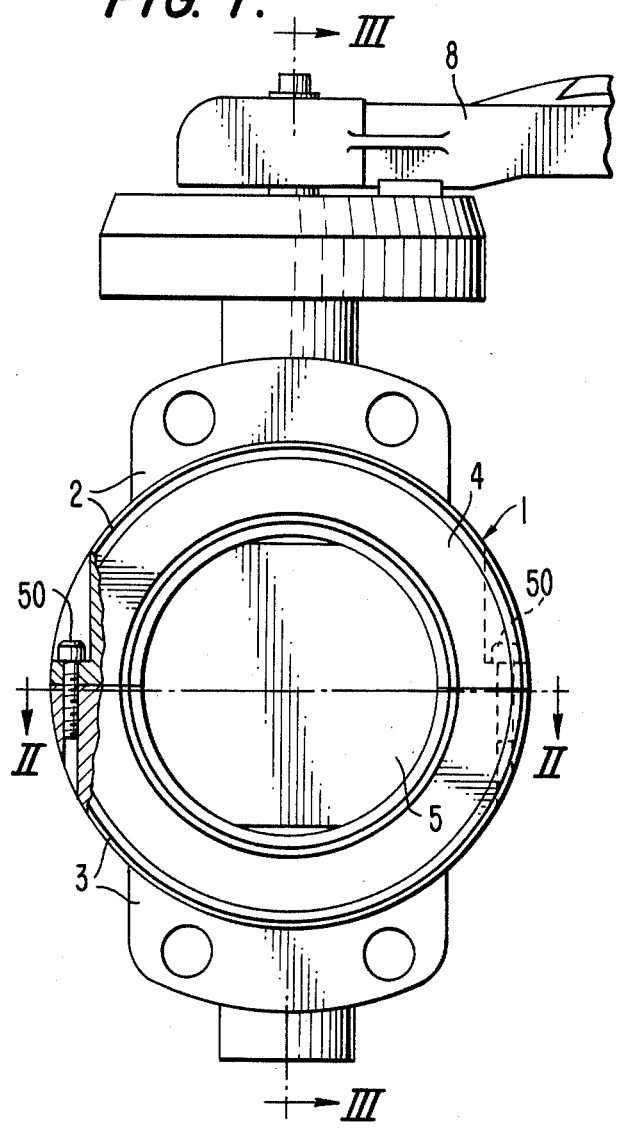
FIG. 1 is a front view of a first embodiment of a disk valve.
Figure 2:
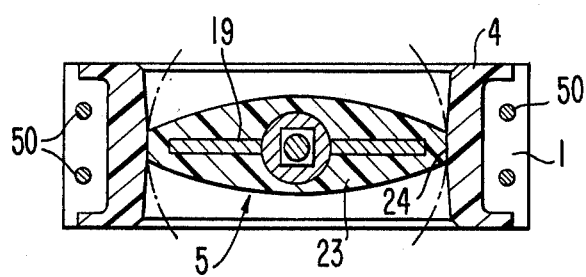
FIG. 2 is a sectional view of the disk valve taken along the line II—II in FIG. 1.
Figure 4:
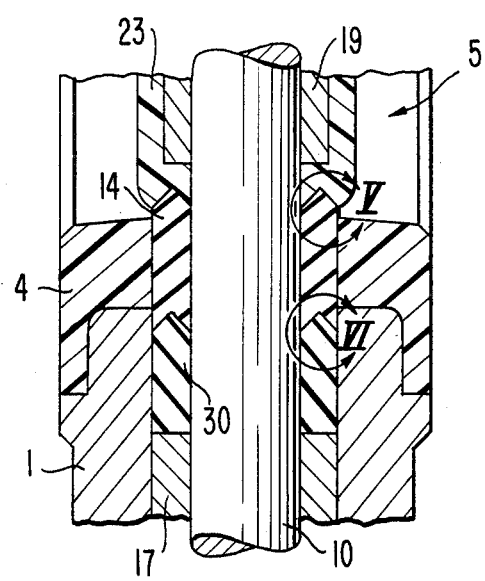
FIG. 4 shows the lower sealing bushes of the disk valve according to a partial section IV in FIG. 3.

The FIGS. 1 to 6 show a disk valve for corrosive fluids with a tubular metal housing 1 lined with a hard-elastic, unpadded plastic coating 4, e.g. of polytetrafluor ethylene. The metal housng 1 is divided into two parts 2, 3 at its horizontal median plane and is held together by screws 50, cg. FIG. 1 and 2.

The inner opening of the tubular metal housing 1 can be closed by a throttle disk 5 consisting of a steel core 19 with a hard-sealing, unpadded covering 23, e.g. of sintered perfluoralkoxy, of a thickness of at least millimeters. The throttle disk 5 is pivotally attached to two pivot pins 9, 10 extending through the coating 4 and the housing 1, the upper pivot pin 9 being joint for a common rotation to the throttle disk 5 by a square bar 11 and to an actuating lever 8 by an adjusting feather 12.

Figure 3:
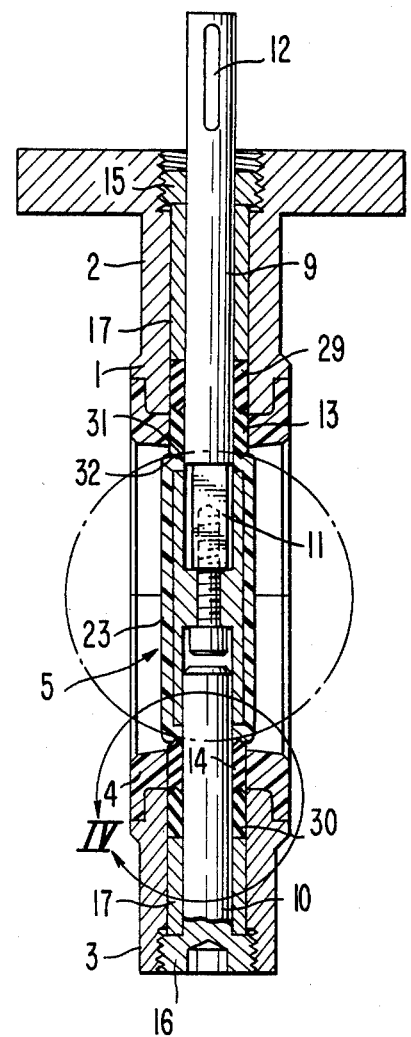
FIG. 3 is a sectional view of the disk valve taken along the line III—III in FIG. 1.

The closed throttle disk 5 seals the metal housing 1 in a transverse plane comprising the axis of the pivot pins 9, 10, wherein the sealing peripheral surface 24 is profiled like a symmetrical spherical sector as indicated by dot-dash circles in the FIGS. 2 and 3. As a comparison of the FIGS. 2 and 3 clearly demonstrates, the breadth of the peripheral surface 24 continuously diminishs from the upper and lower pivot bearings of the disk 5 to its horizontal medium plane, whereby on the one hand an optimal sealing and on the other hand an easy operation of the throttle disk 5 are achieved. The front faces of the throttle disk 5 are smoothbore profiles so that the sedimentation of abrasive substances is prevented.

The pivot pins 9, 10 are enclosed at their bearings by separate, hard-elastic sealing bushes 13, 14, 29, 30 preferably consisting of polytetrafluor ethylene. As shown in the FIGS. 4 to 6 for the example of the lower bearing, the inner sealing bush 14—and accordingly the bush 13 of the upper bearing—is pressed with a wedge-shaped front end 31 into a V-shaped annular groove 32 of the covering 23 of the disk 5. Thus, an excellent radial sealing of the pivot pins 9, 10 is achieved. In order to compensate excentricities due to the manufacture, outer sealing bushes 29, 30 are axially added to each of the inner sealing bushes 13, 14, the inner sealing bushes 13, 14 having V-shaped grooves 33 at their rear ends, and the outer sealing bushes 39, 40 being pressed with their wedge-shaped front ends 34 into said grooves 33. Each set of the bushes 13, 29 respectively 14, 30 can be adjusted by rearward abutment nuts 15, 16, wherein metal bearing bushes 17 are interposed between the sealing bushes 13, 29 respectively 14, 30 and the nuts 15, 16. Due to these bearing bushes 17, the sealing bushes 13, 29, 14, 30 only cover a short axial distance which is really necessary for a sufficient sealing of the housing 1. Thus, the radial enlargement of the sealing bushes 13, 29, 14, 30 by an axial pressing causes such a low clamping effect that the throttle disk 5 can easily be rotated. Furthermore, the bearing bushes 17 exactly guide the pivot pins 9, 10.

Figure 5:
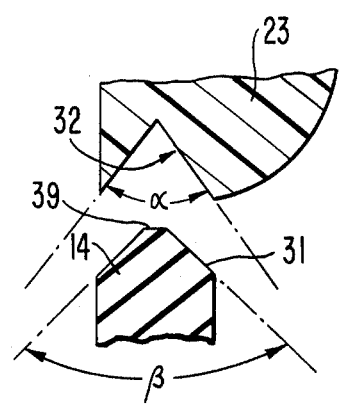
FIG. 5 is an enlarged view illustrating the combination of the V-groove of the disk covering and the wedge-shaped front end of a sealing bush according to a partial section V in FIG. 4.
Figure 6:
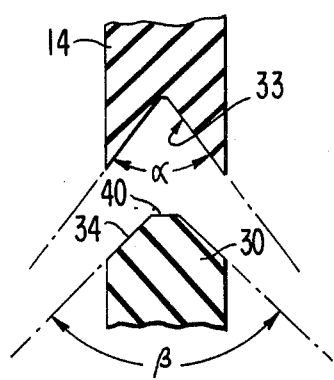
FIG. 6 is an enlarged view of the transition point between two sealing bushes according to a partial section VI in FIG. 4.

As the FIGS. 5 and 6 illustrate, the wedge angles $\beta$ of the front ends 31, 34 of the sealing bushes 13, 14, 29, 30 are greater than the respective groove angles $\alpha$ of the grooves 32, 33. By this way, a high pressing of the sealing surfaces is even obtained, if for example the covering 23 of the disk 5 laterally evades by creeping. Moreover, the wedge edges 39, 40 are beveled so that a well defined correlation of the sealing surfaces is acheived, even in case of manufacturing variations. Furthermore, these measures make possible an axisl adjustment of the sealing bushes 13, 14, 29, 30 by the abutment nuts 15, 16. Because of the combination of the disk covering 23 of perfluoralkoxy and the sealing bushes 13, 14 of the somewhat softer polytetrafluor ethylene, mainly the front ends 31 of the sealing bushes 13, 14 wear off, whereas the disk covering 23 is factually preserved. Thus after several adjustment of the abutment nuts 15, 16, only the cheap sealing buses 13, 14, 29, 30 have to be exchanged, while the main components of the disk valve have a very long working life.

Figure 7:
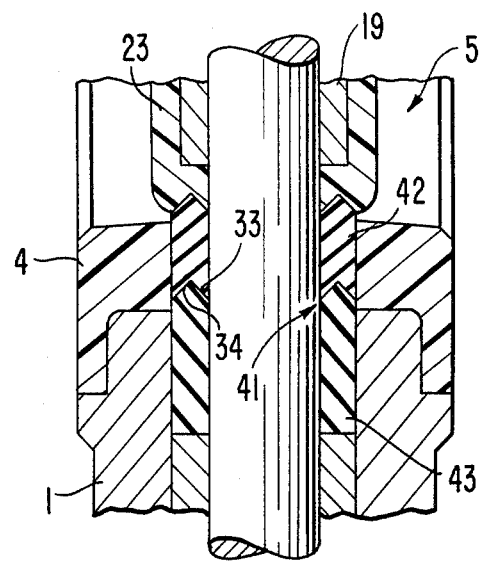
FIG. 7 illustrates a second embodiment of a disk valve in an analogous view as in FIG. 4.

The embodiment of FIG. 7 is principally identical to the embodiment of the FIGS. 1 to 6. The only difference consists in the detail that the transition point 41 between the two sealing bushes 42, 43 is within the reach of the coating 4 of the housing 1. By this arrangement of the V-groove 33 and the wedge-shaped front end 34 an axial pressing causes a greater radial enlargement of the bushes 42, 43. Thus, the penetration of corrosive fluids is stopped at the latest at the transition point 41 so that the metal housing is safely proteced.

What I claim is:

1. A disk valve for corrosive fluids comprising
   a tubular metal housing lined with a hard-elastic, unpadded coating,
   a throttle disk having a hard-sealing, unpadded covering,
   two pivot pins extending through said coating and said metal housing,
   said throttle disk being attached to said pivot pins, and sealing said metal housing in a transverse plane comprising the axis of said pivot pins,
   said covering having a sealing peripheral surface profiled as a symmetrical spherical sector and having V-shaped annular grooves each surrounding one of said pivot pins,
   separate, hard-elastic sealing bushes enclosing directly the pivot pins and having wedge-shaped front ends, which are adjustable against the covering,
   wherein said covering of the throttle disk is made up of hard synthetic resin and is of a minimum thickness of three millimeters,
   and wherein said sealing bushes are respectively pressed with the wedge-shaped front ends into the V-shaped annular grooves of said disk covering.

2. A disk valve according to claim 1, further comprising rearward abutment nuts for adjusting the sealing bushes and bearing bushes respectively interposed between said sealing bushes and said abutment nuts.

3. A disk valve according to claim 1, wherein each pivot pin is enclosed by at least two sealing bushes axially installed in series and wherein the inner sealing bushes have V-shaped grooves at their rear ends and the respective outer bushes have wedge-shaped front ends pressed into said grooves.

4. A disk valve according to claim 3, wherein the transition point between the two sealing bushes is within the reach of the coating of the metal housing.

5. A disk valve according to claim 1, wherein the wedge angles at the front ends of the sealing bushes are greater than the respective groove angles at the covering of the throttle disk.

6. A disk valve according to claim 3, wherein the wedge angles at the front ends of the outer sealing bushes are greater than the respective groove angles at the rear ends of the inner sealing bushes.

7. A disk valve according to claim 5, wherein the edges of the wedge-shaped front ends are beveled.

8. A disk valve according to claim 6, wherein the edges of the wedge-shaped front ends are beveled.

9. A disk valve according to claim 1, wherein the covering of the throttle disk is made up of perfluoralkoxy and the sealing bushes consist of polytetrafluor ethylene.

* * * * *